United States Patent [19]

Kawamura

[11] 4,003,166
[45] Jan. 18, 1977

[54] LOADING APPARATUS FOR A MACHINE TOOL

[75] Inventor: Toshihito Kawamura, Kariya, Japan

[73] Assignee: Toyoda Koki Kabushiki Kaisha, Japan

[22] Filed: Sept. 15, 1975

[21] Appl. No.: 613,521

[30] Foreign Application Priority Data

Sept. 14, 1974 Japan ............................ 49-105527

[52] U.S. Cl. .................................... 51/215 HM
[51] Int. Cl.² ........................................ B24B 47/10
[58] Field of Search .... 51/53, 108 R, 134, 215 AR, 51/215 HM, 215 R

[56] References Cited

UNITED STATES PATENTS

| | | | |
|---|---|---|---|
| 2,349,638 | 5/1944 | Schreiber | 51/215 AR |
| 3,226,886 | 1/1966 | Seidel | 51/215 R |
| 3,425,169 | 2/1969 | Dunn | 51/215 HM X |
| 3,601,927 | 8/1971 | Kikuchi | 51/215 R |
| 3,716,952 | 2/1973 | Terahara | 51/215 HM |

FOREIGN PATENTS OR APPLICATIONS

| | | | |
|---|---|---|---|
| 19,868 | 3/1966 | Japan | 51/215 HM |

*Primary Examiner*—Gary L. Smith
*Attorney, Agent, or Firm*—Oblon, Fisher, Spivak, McClelland & Maier

[57] ABSTRACT

A loading apparatus for loading non-circular workpieces onto a spindle chuck rotatably supported upon a headstock of a machine tool includes a pivotable transfer arm having a pair of grippers at the opposite ends thereof for transferring the workpieces from a charging device to a shifting device, the latter of which is disposed in axial alignment with the axis of the spindle chuck at a position spaced from the headstock and which is adapted to mount the workpiece upon the spindle chuck as a result of a shifting movement. The charging means for conveying the workpieces is disposed in parallel relationship with the shifting means and is provided with shutter means presenting the workpieces in serial fashion. The apparatus also includes an aspect adjusting mechanism by which the workpiece presented to the transfer arm is adjusted with respect to the angular position thereof.

7 Claims, 9 Drawing Figures

Fig. 1

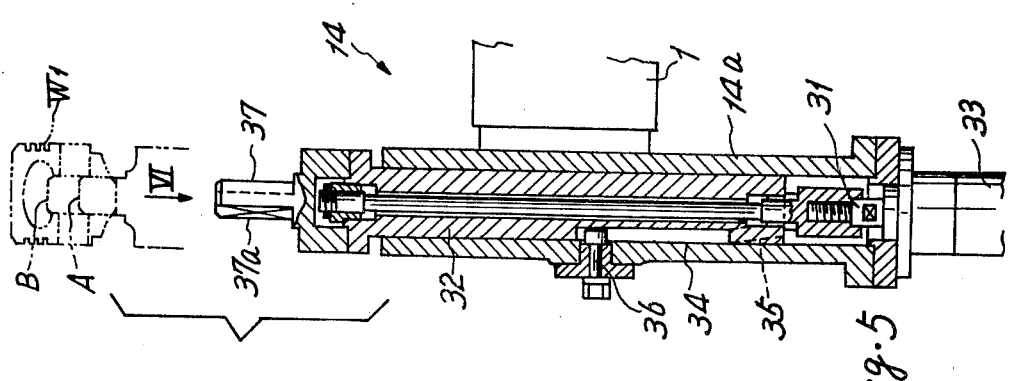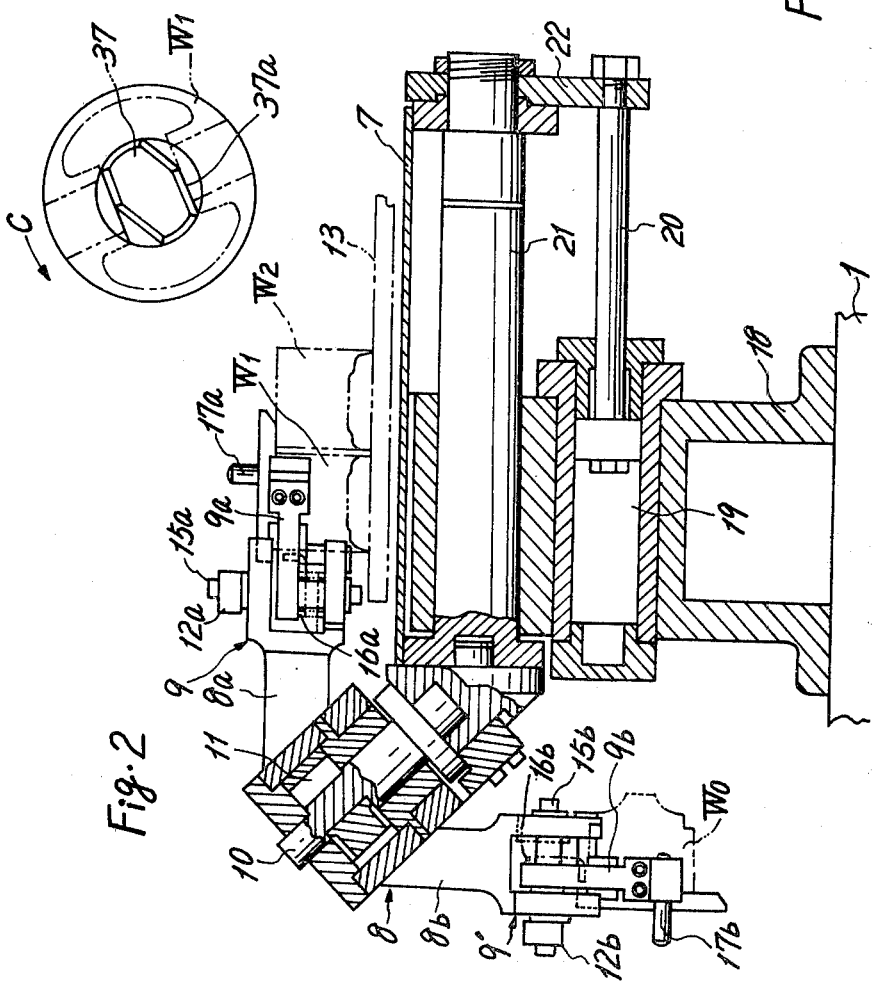

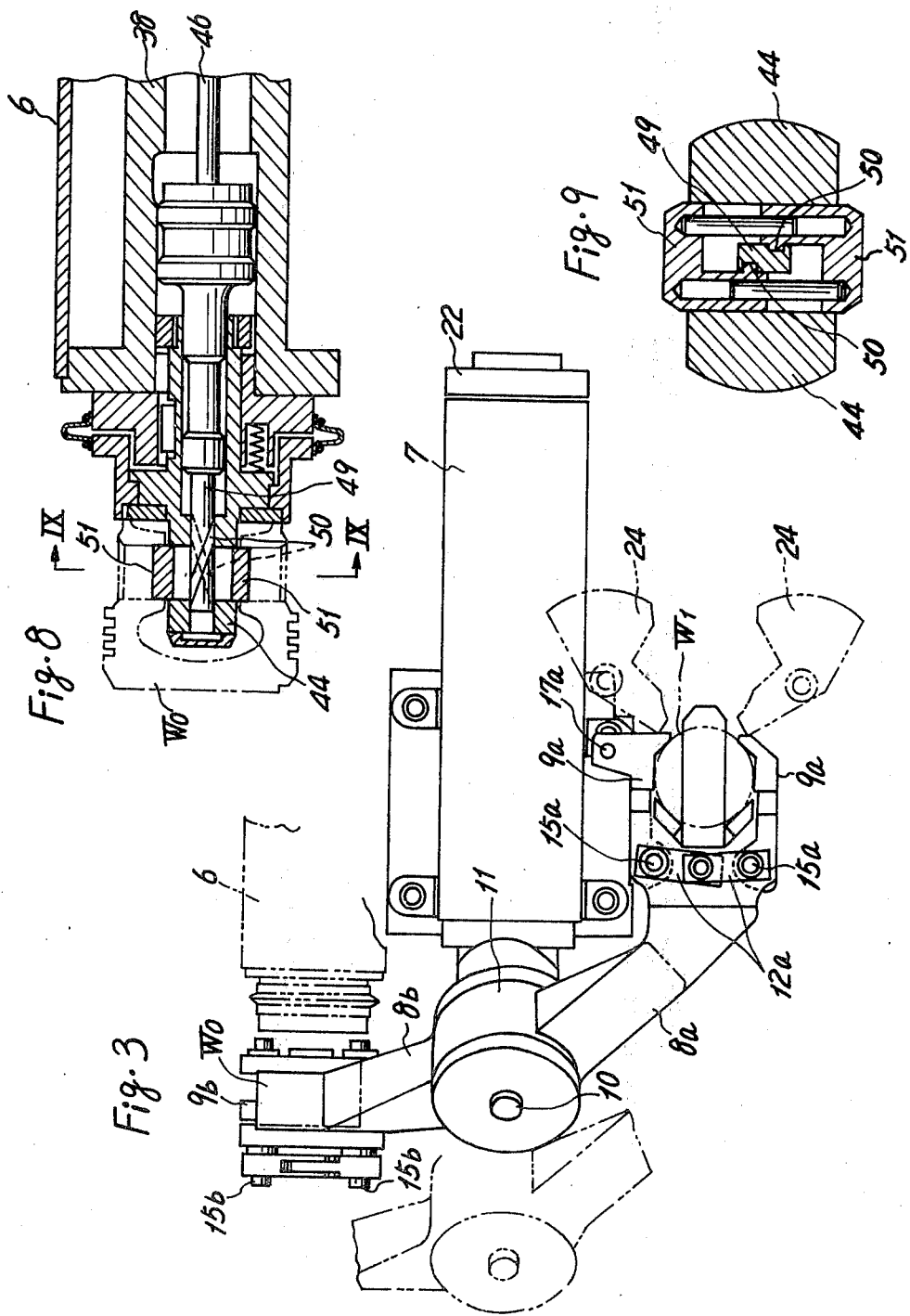

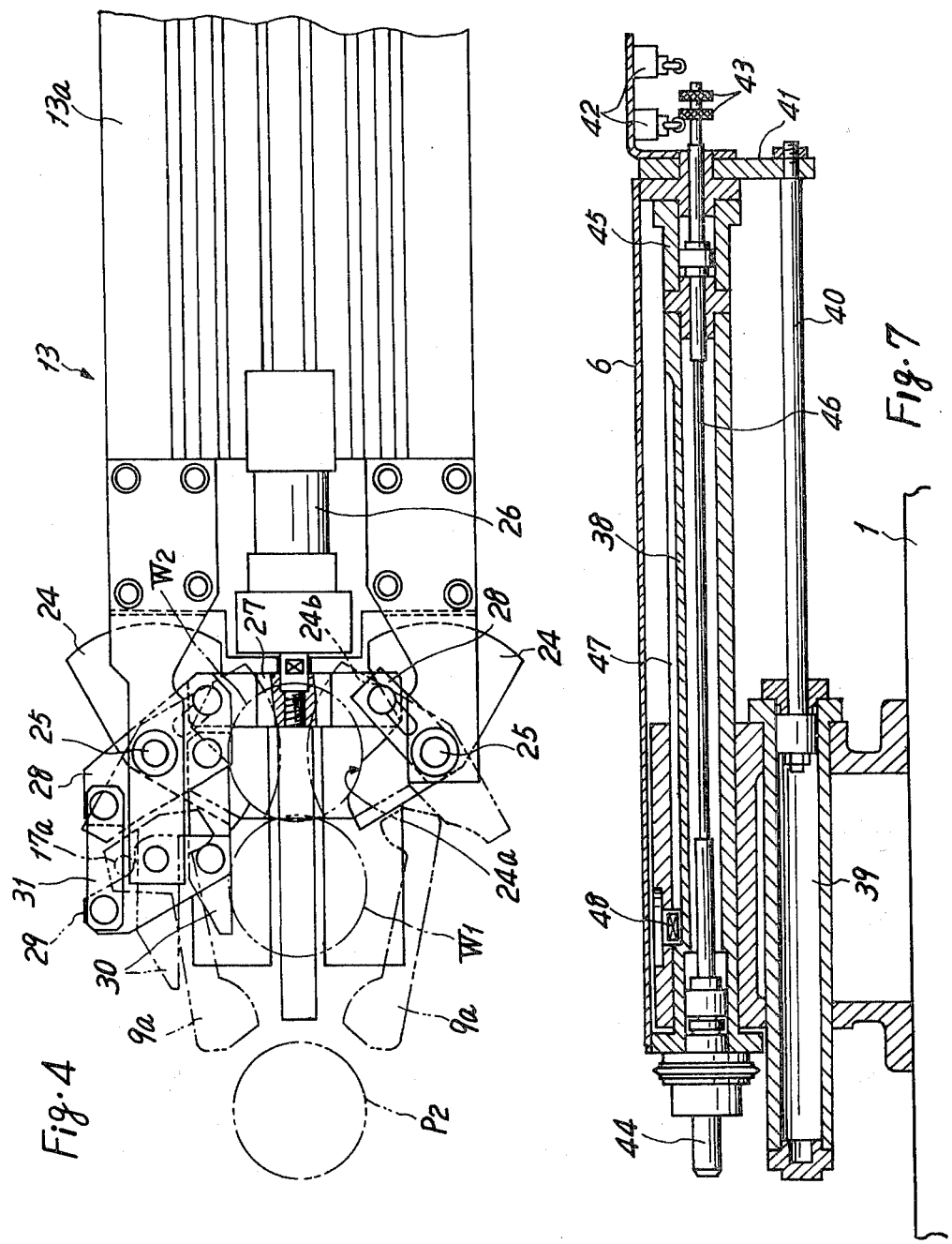

LOADING APPARATUS FOR A MACHINE TOOL

BACKGROUND OF THE INVENTION

1. Field of the Invention

The present invention relates generally to an apparatus for loading workpieces, and more particularly to an improved apparatus for loading non-circular workpieces, such as, for example, pistons of an internal combustion engine, with a uniform angular aspect or orientation, onto a spindle chuck of a machine tool.

2. Description of the Prior Art

Heretofore, there has been known several loading apparatus for automatically loading workpieces, of the type noted hereinabove, onto a spindle chuck of a grinding machine. To cite one example, in the loading apparatus as disclosed within U.S. Pat. No. 3,716,952 to G. Terahara, dated Feb. 20, 1973, a workpiece charging mechanism and a discharging chute are disposed in parallel within the vicinity of a spindle chuck in a direction perpendicular to the longitudinal direction of a worktable. The charging mechanism is provided at the front end thereof with a rotating mechanism which operates to index a workpiece supplied by the charging mechanism onto an extension of the spindle chuck axis, and in axial alignment with the axis of the spindle chuck, there is further provided a shifting mechanism by which the indexed workpiece is held and then transferred to the spindle chuck.

However, within such a loading apparatus, a drawback is noted in that the space forwardly of the spindle chuck is remarkably restrained for the charging mechanism, having the rotating mechanism, is mounted together with the discharging chute upon the worktable within the vicinity of the spindle chuck. This therefore results in the decrease of the working property or area as well as confining or restricting an operator access to the machine tool. Moreover, as the charging mechanism considerably overhangs from the worktable, a large floor space is necessary to install the machine tool.

SUMMARY OF THE INVENTION

Accordingly, it is an object of the present invention to provide an improved loading apparatus having a large space or vacant area beside the spindle chuck.

Another object of the present invention is to provide an improved loading apparatus within which a workpiece charging device is disposed in parallel relationship with a shifting device which is co-axially aligned with the axis of the spindle chuck so as not to disturb or obstruct the working property disposed forwardly of the spindle chuck.

Still another object of the present invention is to provide an improved loading apparatus within which a pivotable transfer arm is employed to speedily and precisely transfer the non-circular workpieces from the charging device to the shifting device.

A further object of the present invention is to provide an improved loading apparatus of the last-mentioned type wherein a shutter means, for presenting the non-circular workpieces in a serial manner to the pivotable transfer arm, also serves to operate each of the work grippers provided upon the diametrically opposed ends of the transfer arm.

A still further object of the present invention is to provide an improved loading apparatus as last-mentioned wherein each work gripper of the transfer arm is adapted to permit a non-circular workpiece having been gripped thereby to be angularly adjusted by an aspect adjusting means.

The foregoing and other objects are attained by the present invention through the provision of a loading apparatus which comprises workpiece charging means, shutter means for serially presenting the non-circular workpieces conveyed by the charging means, shifting means shiftable toward and away from the spindle chuck for individually mounting the workpieces upon the spindle chuck, a transfer arm having a pair of grippers at the opposite ends thereof for transferring the workpieces from the charging means to the shifting means through pivotal movement thereof, and aspect adjusting means for correcting the angular disposition of the individual non-circular workpieces received by the transfer arm.

The shifting means is disposed in axial alignment with the axis of the spindle chuck and is spaced from the headstock supporting the spindle chuck. The charging means is disposed in parallel relationship with the shifting means and between which the transfer arm is operably mounted, and accordingly, since there is no structure interposed between the headstock and the shifting means, the working property thereof can be remarkably improved, and this facilitates the monitoring of the condition of the machining process, the performance of adjustments upon the machine tool, and the exchange of the tools, such as, for example, a grinding wheel, or the like.

In addition, as the transfer arm is provided simply for delivering the workpieces to the shifting means which in turn mounts the workpieces upon the spindle chuck through a simple shifting motion thereof, there is no necessity of moving the transfer arm toward the spindle chuck. Therefore, not only is the construction of the transfer arm, as well as that of the loading apparatus, substantially simplified in its entirety, but as a result thereof, the speed of the loading operation is also increased which in turn increases the machining efficiency.

BRIEF DESCRIPTION OF THE DRAWINGS

Various other objects, features, and attendant advantages of the present invention will be more fully appreciated as the same becomes better understood from the following detailed description when considered in connection with the accompanying drawings, in which like reference characters designate like or corresponding parts throughout the several views, and wherein:

FIG. 1 is a plan view of a loading apparatus constructed in accordance with the present invention and showing its cooperative parts;

FIG. 2 is a longitudinal cross-sectional view of the apparatus shown in FIG. 1 taken along the line II—II of FIG. 1;

FIG. 3 is a plan view of the transfer device shown within FIG. 2;

FIG. 4 is a plan view of the charging device shown within FIG. 1, and particularly illustrating the shutter mechanism thereof;

FIG. 5 is a longitudinal cross-sectional view of the aspect adjusting device shown within FIG. 1;

FIG. 6 is an enlarged plan view of the adjusting device of FIG. 5 taken in the direction of arrow VI of FIG. 5;

FIG. 7 is a longitudinal cross-sectional view of the shifting device shown within FIG. 1;

FIG. 8 is an enlarged, fragmental, longitudinal cross-sectional view of a portion of the device of FIG. 7; and FIG. 9 is a cross-sectional view of the device of FIG. 8 taken along the line IX—IX of FIG. 8.

DETAILED DESCRIPTION OF A PREFERRED EMBODIMENT

Figure 1:
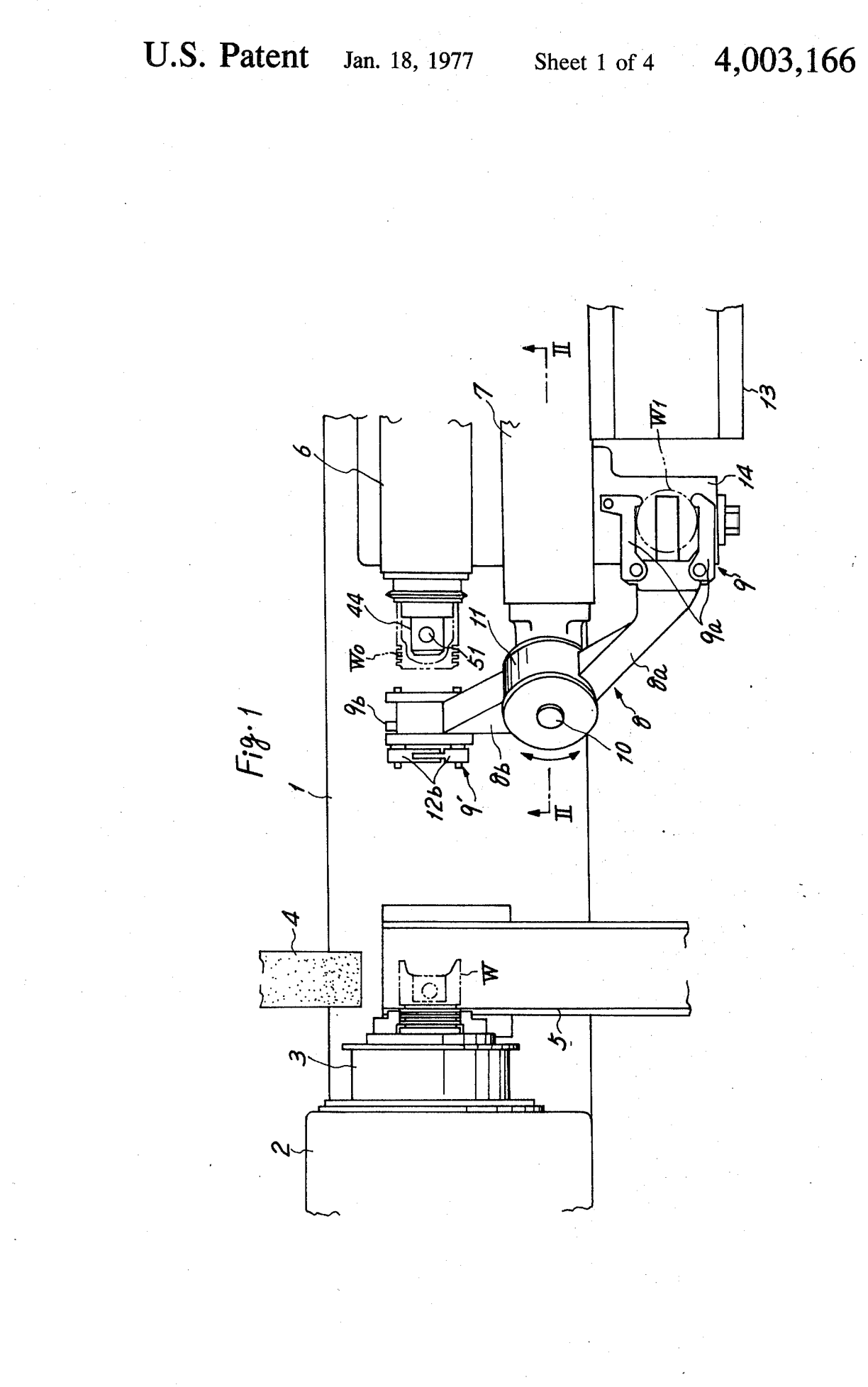

Referring now to the drawings, and more particularly to FIG. 1 thereof, a worktable 1, of a grinding machine for grinding a non-circular workpiece such as, for example, the aforementioned piston, has a headstock 2 fixedly mounted upon one end thereof and which includes a rotatable spindle which is provided with a diaphragm chuck 3. A grinding wheel 4 is rotatably supported and movable toward and away from a workpiece W secured within the chuck 3 for grinding the workpiece W, and a discharge chute 5 is disposed with one end thereof extending underneath the chuck 3 for facilitating the discharge of the ground workpiece from the grinding machine.

Upon worktable 1 there is also mounted a shifting device 6 which is coaxially aligned with the rotatable spindle and disposed opposite headstock 2 with a considerable distance being defined therebetween. A workpiece charging device 13, including a chute of the conveyer type, is disposed laterally of the worktable 1 with the chute-way disposed parallel with the shifting device 6. Between the shifting device 6 and the charging device 13 there is also mounted upon worktable 1 a transfer device 7 within which a transfer arm 8, for delivering the workpieces W from the charging device 13 to the shifting device 6, is provided so as to be rotatable about a pivot axis 10 and shiftable in a direction parallel with the axis of the rotatable spindle. An aspect adjusting device 14 is further provided laterally of the worktable 1 for adjusting the angular aspect or orientation of the workpiece W which the transfer device 7 has received from the charging device 13.

The details of the aforenoted devices disposed upon the worktable 1 will now be described hereinafter. As is shown within FIGS. 2 and 3, the transfer device 7 includes a fixed support base 18 within which an arm shifting actuator 19 is provided with a piston rod 20 moving parallel to the axis of the aforementioned rotatable spindle. An operational ram 21 is slidably guided upon the support base 18 in a direction corresponding to that of the spindle axis and is connected by means of a connecting plate 22 with the outer end of the piston rod 20 whereby the slidable movement of the ram 21 is controlled by means of the shifting actuator 19. At the left end of the ram, the pivot axis or center shaft 10 is mounted with a predetermined angle of inclination with respect to the axis of ram 21, the angle being for example, 45°.

The center shaft 10 constitutes, along with a rotatable cylinder 11, a conventional rotary actuator from which a pair of arms 8a and 8b extend in diametrically opposite directions, each of the arms defining an angle of 45 degrees with respect to the axis of the center shaft 10. At the extreme ends of the arms 8a and 8b, a pair of grippers, generally indicated by the reference characters 9 and 9' each of which comprises two finger elements 9a or 9b, is provided for gripping a workpiece W, the finger elements 9a being respectively mounted upon pivot pins 15a which are linked with each other through means of link elements 12a, as best shown within FIG. 3, so as to transmit the motion of one of the finger elements 9a to the other. A torque spring 16a is associated with one of the finger elements 9a which are thus always biased to the closed position, and furthermore, there is also provided a protrusion 17a which is fixed upon one of the finger elements 9a. The other gripper 9' comprising finger elements 9b is constructed in a manner similar to that of gripper 9, the associate parts thereof being represented by like numerals and with a small letter b, and it is also seen that each of the protrusions 17a and 17b is engageable with shutters 24, described in detail hereinafter so that each of the grippers 9 and 9' when located at the charging device 13, can be opened by means of the shutters 24.

Referring now to FIG. 4 which illustrates in detail the charging device 13, a horizontal chute 13a of the conveyer type is provided upon and along which the workpieces W are conveyed in a single line. At the forward or left end of chute 13a, the aforementioned shutters 24 are pivotably supported about pivot shafts 25 and are each formed with a stopping face 24a, for stopping a workpiece W, and a pushing face 24b. A shutter actuator 26 is operably connected to a connecting member 27 which is in turn connected to both of the shutters 24 through means of link elements 28. An operating plate 30, together with link elements 29 and 31, and the link element 28, constitutes a parallel motion mechanism, the link elements 28 and 29 being pivoted at the forward extreme end of the chute 13a, and plate 30 is engageable with the protrusions 17a and 17b. It is therefore noted that the transfer arm 8 does not have an actuator for operating the grippers 9 and 9' and consequently, a rapid transfer operation of the arm is able to be achieved.

Within FIGS. 5 and 6 which show the aspect adjusting device 14, a sleeve 32 is vertically slidably retained within a cylindrical body 14a which is mounted on the worktable 1 with its axis extending vertically in axial alignment with a workpiece W which has been gripped by one of the grippers 9 and 9'. Secured at the uppermost end of sleeve 32 is an engaging plug 37 within which, as best shown within FIG. 6, a diamond-shaped reference face 37a is formed for correcting the aspect or orientation of the workpiece W as a result of insertion thereinto. In addition, the sleeve 32 is formed, at a portion of the peripheral surface thereof, with a longitudinally extending guide groove 34 and a helical groove 35 which commences from guide groove 34 and into which a pilot pin 36, keyed upon the cylindrical body 14a, is inserted, the sleeve being further connected at the lowermost end thereof with a piston rod 31 of a sleeve actuator 33.

With reference now being made to FIGS. 7–9 which show the details of the shifting device 6, a shifting actuator 39 has a piston rod 40 which is slidably disposed parallel with the above-referred spindle axis. A shiftable sleeve 38, axially aligned with the spindle axis, is capable of moving toward and away from the spindle chuck 3 by having the rear end thereof connected with the piston rod 40 through means of a connecting member 41. Disposed within the shiftable sleeve 38 is a coupling rod 46 one end of which is operatively associated with a workpiece carrier 44 while the other end thereof is responsive to a clamp actuator 45. Dogs 43 co-operate with limit switches 42 for defining the slidable limit positions of the coupling rod 46, and a key 48 is engaged with a key-way 47 of the shiftable sleeve 38.

The structure of the workpiece carrier 44 is shown within FIGS. 8 and 9, wherein it is disclosed that a pair of locating pins 51 are so arranged as to be radially extensible. In order to radially move the locating pins 51, a control rod 49 integral with the coupling rod 46 is formed with inclined pilot ways or grooves 50 within which the locating pins 51 are disposed, the pilot ways 50 respectively forming an acclivity and a declivity toward one side of the carrier. It can therefore be well understood that the rearward movement of the control rod 49 causes the locating pins 51 to be extended outwardly, while the forward movement thereof causes the same to be drawn inwardly. The locating pins 51 are, when extended outwardly, snugly inserted into pin holes, not numbered, of the workpiece W so as to thereby precisely locate and support the workpiece W upon the carrier 44.

The operation of the apparatus constructed as disclosed hereinabove will now be described hereinbelow. The workpieces W, conveyed by means of the charging chute 13a, are charged into the stationed workpiece gripper 9 in a serial fashion one by one through means of the opening motion of the shutters 24. To be more precise, within the closed condition, the shutters 24 have the stopping faces 24a closed with respect to each other, as illustrated by the solid lines of FIG. 4, and such inhibits the most advanced workpiece W from advancing further. When the shutter actuator 26 is operated in response to a given charging instruction or signal, the shutters 24 are pivotably moved to their open positions as shown by the phantom lines, whereby the most advanced workpiece $W_1$ is charged into the gripper 9 by means of the pushing faces 24b of shutters 24, as seen within FIG. 2.

It is to be noted that prior to the above-mentioned operation of the shutter actuator 26, the transfer arm 8 has been retracted, through means of the rearward movement of the shifting actuator 19, and thus, has, on one hand, the gripper 9 disposed at the receiving position and, on the other hand, the other gripper 9' disposed at the delivering position. The workpiece $W_o$ which has been charged into the gripper 9' within the previous charging operation, is delivered to the workpiece carrier 44 as a result of the retractable movement of the transfer arm 8, as will be described in greater detail hereinafter.

The gripper 9, having been disposed at the receiving position, has the finger elements 9a closed with respect to each other by means of the torque spring 16a, however, when the shutters 24 are opened, as noted hereinabove, the operating plate 30 traverses a parallel movement, that is, the plate remains parallel with respect to its original disposition while moving outwardly, due to the disposition and interrelationship of link elements 28, 29, and 31, and as a result, moves the protrusion 17a, fixed upon one of the finger elements 9a, outwardly as shown by the phantom line within FIG. 4. Accordingly, both of the finger elements 9a of the gripper 9 are pivoted together with the pivot pins 15a and are placed in the open condition in opposition to the biasing force of the torque spring 16a.

At the same time of the opening movement of the gripper 9, the most advanced workpiece $W_1$ is charged into the gripper 9 as a result of being pushed by means of the pushing faces 24b of shutters 24, and subsequently, the shutters 24 are closed as a result of the rearward movement of the shutter actuator 26, as shown by the solid line of FIG. 4, so as to stop the movement of the succeeding or following workpiece $W_2$ by means of the stopping faces 24a of the shutters. This action also effects the release of the protrusion 17a from the operating plate 30 so that the gripper 9 can be closed under the influence of the biasing force of torque spring 16a, thus gripping the workpiece $W_1$ which is now at the receiving position.

Thereafter, the transfer arm 8 is shifted forwardly through means of the operation of the shifting actuator 19, whereby the workpiece $W_1$ is held by the gripper in such a manner that the axis thereof remains extended perpendicularly to the base of the apparatus at the forward shifted position $P_2$ as seen in FIG. 4. Beneath the gripped workpiece $W_1$ disposed at the forward shifted position $P_2$, there is provided the aspect adjusting device 14 for angularly correcting and uniformizing the angular disposition of the workpiece $W_1$ to a predetermined angular position. In accordance therewith, the sleeve shifting actuator 33 is actuated so as to move sleeve 32 vertically which is in fact elevated as a result of the engagement between pilot pin 36 and guide groove 34, the engaging plug 37 being engaged with the internal bore of the workpiece $W_1$ being held by means of gripper 9. Subsequently, the pilot pin 36 is engaged with the helical groove 35 which thereby causes the sleeve 32 to initiate a predetermined angular movement or rotation depending upon the inclination angle thereof. The sleeve 32 is in fact rotated through the angular displacement denoted by arrow C of FIG. 6 which the is also moved from the stroke position denoted by position A, shown in phantom lines of FIG. 5, to the stroke position B, the same being accomplished through means of contact with the reference face 37a of plug 37. In this manner, the workpiece $W_1$ is angularly indexed so that at the upper stroke position B of sleeve 32, the workpieces can be uniformly oriented to the predetermined angular position. It should be noted herein that the gripper 9 does not obstruct the indexing movement of the workpiece $W_1$ since it is biased to the closed position by means of the biasing force of the torque spring 16a.

Immediately subsequent to the adjustment of the angular position of the workpiece, the sleeve 32 is moved downwardly to its retracted position whereupon the rotary actuator 11 is then actuated so as to rotate the transfer arm 8 in the clockwise direction and through an angular displacement of 90° to a neutral or parked position. The transfer arm 8 which has thus previously delivered a workpiece $W_o$ to the shifting device 6, is therefore moved out of the delivery position, which in effect is an extension of the spindle axis, and therefore does not obstruct the shifting operation of the shifting device 6.

The operation of the shifting device will now be described. It is assumed that the transfer arm 8 is positioned at the parked position after the gripper 9 has gripped a workpiece $W_1$ at the receiving position through means of a gripping operation performed in the same manner as that previously described, and the empty gripper 9', having previously deposited a workpiece upon carrier 44, is likewise disposed between the receiving and delivering stations. The transfer arm 8 is further rotated in the clockwise direction through an angular displacement of 90° so as to align the workpiece $W_1$ ($W_o$) with the workpiece carrier 44 and is shifted rearwardly so that the workpiece $W_o$ can be snugly engaged at the internal bore thereof with the workpiece carrier 44. In this situation, the clamp actuator 45 is actuated rearwardly so as to retract the control rod 49 through means of the coupling rod 46, and consequently, the locating pins 51 are respectively inserted into the pin holes of the workpiece $W_o$ as a result of the outward projection thereof in response to the movement of the pilot ways 50 so as to precisely clamp the workpiece $W_o$ upon the carrier 44. At the same time, the empty gripper 9' has been moved from its parked position to the receiving station and charged with a new workpiece W.

Thereafter the transfer arm 8 is shifted forwardly and is rotated in the counterclockwise direction and through an angular displacemet of 90° into the parked position. As a result of the subsequent operation of the shifting actuator 39, the shiftable sleeve 38 is moved to the advanced position at which the workpiece $W_o$ held by means of the carrier 44 is transferred to the spindle chuck 3. More specifically, after the chuck 3 supports the workpiece $W_o$, the same is released from the carrier 44 as a result of the locating pins 51 being drawn inwardly by means of the advancing operation of the clamping actuator 45. The shiftable sleeve 38 is then moved to the retracted position through means of the rearward operation of the shifting actuator 39, and from this condition, a predetermined machining cycle operation may be commenced in order to machine the workpiece $W_o$ by means of the grinding wheel 4.

During this machining operation, the transfer arm 8 which is now at the parked position is further rotated in the counterclockwise direction through an angular displacement of 90°, whereby on one hand, a new workpiece $W_1$ gripped by means of the gripper 9 is brought to the extension of the spindle axis, while on the other hand, the empty gripper 9' is positioned at the receiving position, the transfer arm 8 then being shifted to the retracted position at which the empty gripper 9' is charged with a new workpiece $W_2$ while the gripper 9 delivers the workpiece $W_1$ to the carrier 44 of the shifting device 6.

Obviously, many modifications and variations of the present invention are possible in light of the above teachings. It is to be understood therefore that within the scope of the appended claims, the present invention may be practiced otherwise than as specifically described herein.

What is claimed as new and desired to be secured by Letters Patent of the United States is:

1. A loading apparatus for loading non-circular workpieces upon a spindle chuck rotatably supported upon a headstock of a machine tool, comprising in combination:

charging means spaced from said headstock and provided with a charging way extending parallel with the axis of said spindle chuck for charging said workpieces in a single line;

shutter means provided at the advanced end of said charging means and operable to be selectively opened and closed for preventing selected ones of said workpieces from further advancing;

shifting means disposed in co-axial alignment with said spindle chuck and shiftable toward and away from said spindle chuck for facilitating mounting of said non-circular workpieces upon said spindle chuck;

a transfer arm pivotably provided for transferring said non-circular workpieces from said charging means to said shifting means and shiftable along an axis parallel with said shifting means for delivering a non-circular workpiece to said shifting means while at the same time receiving another non-circular workpiece from said charging means, said transfer arm having a pair of grippers at the opposite ends thereof; and angular adjusting means for correcting the angular disposition of said workpiece gripped by one of said grippers disposed at the side of said charging means.

2. A loading apparatus as set forth in claim 1, wherein:

the pivot axis of said transfer arm is disposed at a 45° angle of inclination with respect to said shifting axis thereof for changing the orientation of said non-circular workpieces through a 90° angular displacement when the same is transferred from said charging means to said shifting means.

3. A loading apparatus as set forth in claim 2, wherein:

said shutter means is engageable with one of said grippers disposed at the side of said charging means for opening said one of said grippers when said shutter means is opened.

4. A loading apparatus as set forth in claim 2, wherein said shutter means comprises:

a stopping face for stopping said further advancement of said selected ones of said non-circular workpieces when in the closed position; and a pushing face for pushing a selected one of said workpieces into said one of said grippers when in an open position.

5. A loading apparatus as set forth in claim 4, wherein:

each of said grippers is urged to be closed by means of a spring; and said angular adjusting means is adapted to perform said angular adjusting operation for said non-circular workpiece when said one of said grippers grips said non-circular workpiece.

6. A loading apparatus as set forth in claim 2, wherein:

said transfer arm is also indexed to a parked position such that said grippers respectively move away from said shifting means and said charging means so as to prevent said grippers from obstructing the shifting movement of said shifting means.

7. A loading apparatus as set forth in claim 5, wherein said angular adjusting means comprises:

a plug engageable with an internal bore of each of said non-circular workpieces and having a reference face for determining the angular position of each of said workpieces;

a feed device for moving said plug into engagement with said internal bores of said workpieces; and rotational control means having a guide way and a pilot pin for controlling rotation of said plug during the feed movement thereof, said guide way including an inclined way for rotating said plug when the same is inserted within each of said internal bores of said workpieces.

* * * * *